Nov. 30, 1926.

B. C. ROCKWELL

COMPOSITE DOOR JAMB

Filed Feb. 14, 1924   2 Sheets-Sheet 1

1,608,533

Inventor
Byrd C. Rockwell
By Cornwall, Bidell-Janus attys.

Nov. 30, 1926.  
B. C. ROCKWELL  
COMPOSITE DOOR JAMB  
Filed Feb. 14, 1924
1,608,533
2 Sheets-Sheet 2
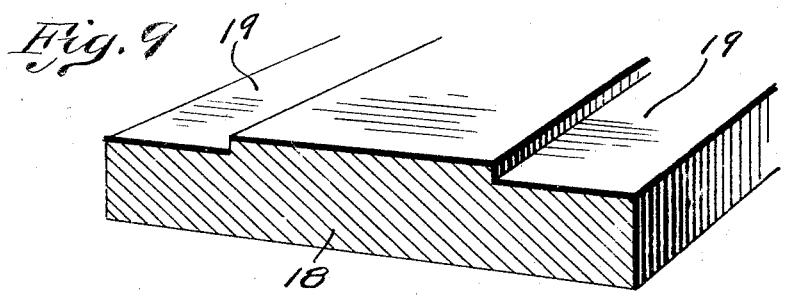
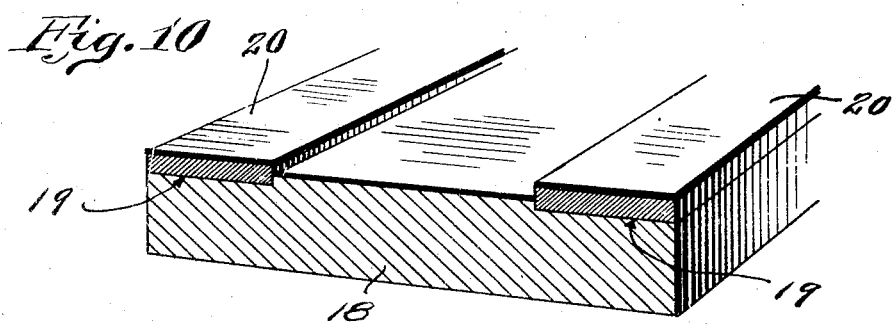
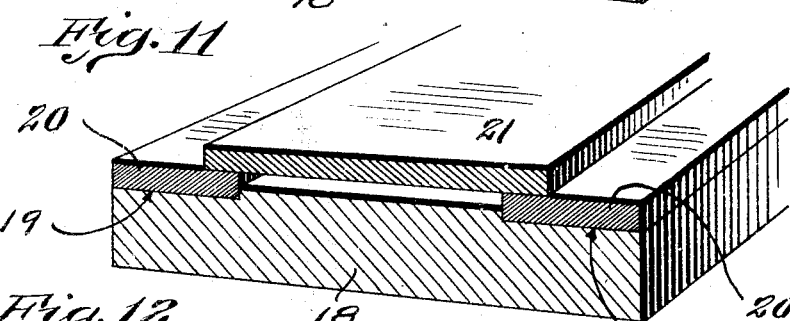
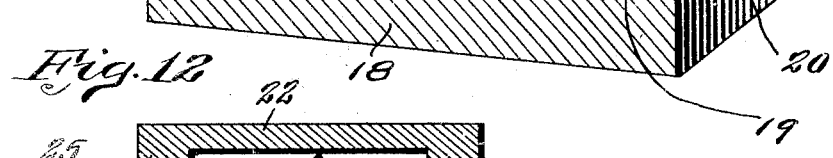
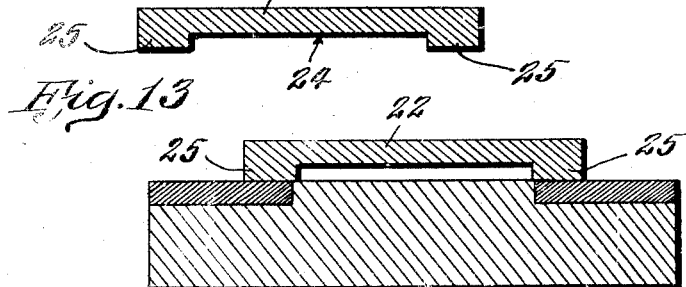
Inventor  
Byrd C. Rockwell  
By Cornwall, Bedell & Janus  
Attys.

Patented Nov. 30, 1926.

1,608,533

UNITED STATES PATENT OFFICE.

BYRD C. ROCKWELL, OF ST. JOSEPH, MISSOURI.

COMPOSITE DOOR JAMB.

Application filed February 14, 1924. Serial No. 692,758.

This invention relates to new and useful improvements in the method of manufacturing composite lumber such as door jambs and the like, and the objects of the invention are to produce lumber for finishing the interior of buildings, trimming doors, etc., which lumber presents the appearance of high grade material, is durable and strong, and can be produced at low cost.

Further objects of the invention are to provide a method of manufacturing composite lumber whereby the material used in the manufacture thereof can be cut from lumber of standard sizes without leaving any waste material, thereby reducing the cost of production to a minimum.

Still further objects of the invention are to produce composite lumber, such as door jambs, having a core body of low grade lumber to which are applied, by brads or suitable adhesive, finishing strips of high grade lumber and which is so constructed that when adhesive is used all danger of end-warping or cupping of the finishing strips is eliminated.

With these and other objects in view, my invention consists in certain novel features of construction and arrangement of parts hereinafter more fully described and claimed and illustrated in the accompanying drawings, in which—

Figure 9 shows a perspective detail view of a modified form of core body.

Figure 10 is a similar view with the finishing strips in position thereon.

Figure 11 is a similar view with the door stop or face strip applied thereto.

Figure 12 is a cross section through a modified form of a door stop.

Figure 13 is a cross section through a door jamb and showing said modified door stop in position.

Under the present practice, door jambs are made of clear high grade lumber of the desired species and in consequence the cost of manufacturing such jambs is very high. My improved method contemplates production of door jambs, etc., in which the amount of clear lumber used is of small percentage and is cut to definite sizes so that stock of standard dimensions can be used without leaving any waste material. The lumber now commonly used for door jambs is of one inch, inch and a half, and two inch stock. By my method the amount of high grade lumber used for finishing or facing the core body is the same for any of the above mentioned sizes so that the percentage of gain when inch and a half jambs are made is fifty percent over the inch gross average and when two inch jambs are made the increase is one hundred percent. For instance, it requires three board feet to make a set of one inch jambs which contain, roughly, ten feet of lumber. Figured on percentage basis, on finished jambs the average of high grade lumber in a set of inch and a half jambs would be two feet and the average in manufacturing two inch jambs would be one and one-half feet. It is to be understood that door jambs require two clear edge portions which are not covered by the casings and are about one-quarter inch thick and have one clear face portion. Usually a door stop is secured in any suitable manner to this face portion and if desired it may be glued in position without danger of end-warping as it is comparatively narrow and does not affect the core body.

Figure 1:
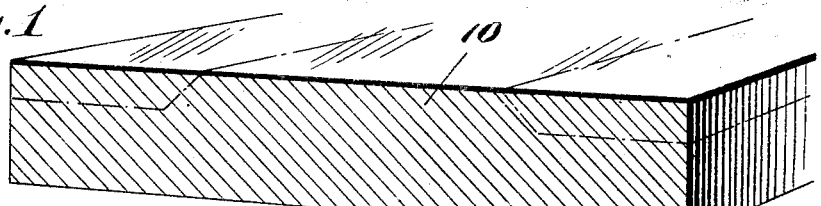
Figure 1 is a perspective detail view of the core body.
Figure 2:
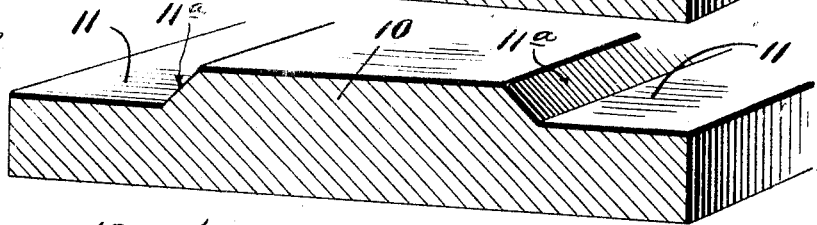
Figure 2 is a similar view showing said core body provided with rabbeted portions.
Figure 3:
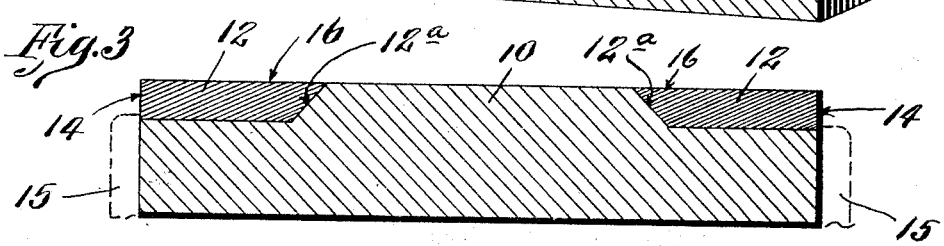
Figure 3 is a cross section through the core body and showing finishing strips of high grade lumber in position in the rabbeted portions.

Referring by numerals to the accompanying drawings, 10 indicates a core body which may be formed of a solid stock of sound low grade lumber or it can be made of built-up strips of the same material in any desired multiple, edge-matched and glued together. This core body is rabbeted to the desired depth and width as indicated at 11 in Figure 2. These rabbeted portions are sufficiently deep to permit the use of strips 12 of clear high grade lumber and of proper thickness so as to provide clear edges 14 for those portions of the jamb which are not covered by a casing 15 while the faces 16 of said strips are preferably flush with the remaining face portion of core body 10 and form the finished face portions of the jamb as shown in Figure 3.

Figure 4:
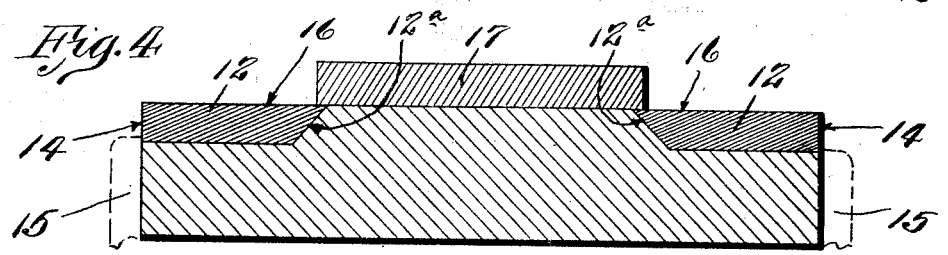
Figure 4 is a similar view showing the door stop or the face strip applied to the face of the core body.

In Figure 4 a door stop 17 is shown attached to the jamb intermediate the finishing strips 12 and extending past the meeting edges of said strips and said rabbeted portions so as to cover the same and the face portion of the core body. The door stop 17 may be secured in position either by suitable adhesive or by means of brads.

Figure 5:
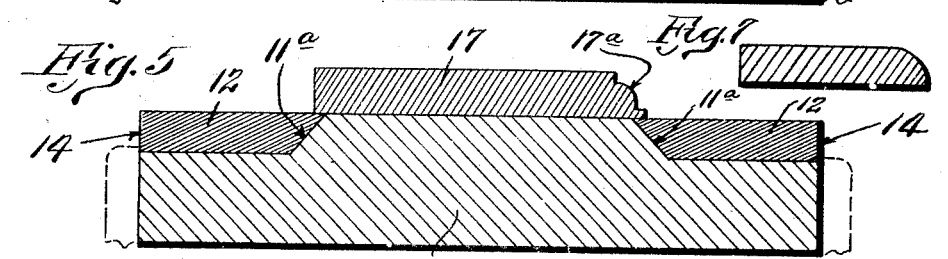
Figure 5 is a similar view showing a modified form of door stop.

Figure 5 shows a jamb made in accordance with my improved method and having the door stop provided with an ornamental edge 17ª.

Figure 6:
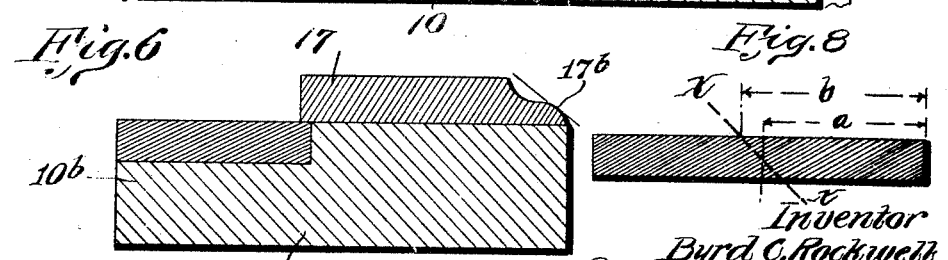
Figure 6 is a modified form showing a jamb having only one rabbeted portion and the door stop thereof provided with an ogee edge.

In Figure 6 a narrow jamb 10ª is shown having only one rabbeted and finished portion 10ᵇ and showing a door stop provided with an ogee edge as indicated at 17ᵇ.

Figure 7:
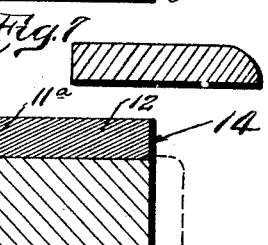
Figure 7 shows still another modified form of door stop.

Figure 7 is a cross section through a door stop and showing still another further form of the same.

Figure 8:
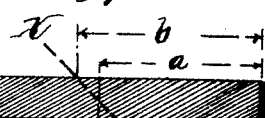
Figure 8 illustrates the method of miter-ripping the finishing strips.

In the manufacture of the face strips 12, high grade lumber of the desired thickness and of standard size is used and is miter-ripped at a predetermined angle in order to provide strips of given face dimensions. This method is illustrated in Figure 8 which shows a cross section through a strip of lumber to be miter-ripped. Line $a$ indicates the width of face portion when the strip is cut at right angles to the face thereof. Line $b$ indicates the width of the face portion when the strip is miter-ripped on line $x$—$x$ in accordance with my method. The angle of inclination of line $x$—$x$ may be varied so as to provide a finishing strip having proper face dimensions. Thus a material saving is effected as there is no waste of the high grade expensive lumber and narrower stock may be used.

In the modified form shown in Figures 9 to 13, the door stop is preferably spaced from the core body. Referring particularly to Figures 9 to 11, inclusive, a core body 18 is formed with comparatively shallow rabbets 19 and secured in these rabbets are face strips 20. The depths of rabbets 19 is less than the thickness of strips 20 and consequently these strips project above the face of said core body and when a door stop 21 is applied in position, the latter is spaced from core body 18. In Figure 12 a door stop 22 is shown provided in its underside with a channel 24, thereby forming downwardly presented shoulders or ribs 25 which are designed to rest on the respective face strips and space the door stop from the core body. This construction insures a snug fit and is particularly desirable when one inch lumber is used for door jambs as it is not necessary to rabbet the core body as deeply as in the previous case and the thickness of the door jamb is correspondingly increased. Where lumber of more than one inch of thickness is used, the depth of the rabbeted portions is preferably equal to the thicknesses of the face strips and the faces of the latter are flush with the face of the core body as shown in the preferred forms. If desired, the jambs may be shipped by the manufacturer without the door stops applied thereto, as shown in Figure 3, thereby giving the distributer or customer opportunity to use a door stop of any desired style.

I claim:

1. The method of manufacturing lumber consisting in rabbeting a core body of low grade lumber, forming the edge wall of said rabbeted portion oblique, miter-ripping a strip of high grade lumber, and applying a strip so formed in said rabbeted portion, the oblique edge of said finishing strip being adapted to cooperate with the oblique wall of said rabbeted portion.

2. The method of manufacturing composite lumber consisting in rabbeting a core body of low grade lumber, forming the inner wall of said rabbet inclined upwardly, sawing a strip of high grade lumber obliquely in a longitudinal direction, whereby a finishing strip of given face dimensions is formed, and securing said strip in said rabbet, the inner oblique edge of said strip cooperating with the inclined wall of said rabbet and the outer edge of said strip forming the exposed edge portion of the lumber.

3. The method of manufacturing composite jambs consisting in rabbeting a core body of low grade lumber, forming the inner wall of said rabbet inclined upwardly, sawing a section of high grade lumber obliquely in a longitudinal direction whereby finishing strips of given face dimensions are formed from a section of lumber of standard size and securing one of said strips in said rabbeted portion with the oblique edge engaging the inclined wall thereof.

4. The method of manufacturing composite lumber consisting in rabbeting the face portion of a core body of low grade lumber, forming the inner walls of said rabbeted portions inclined upwardly, miter-ripping a section of high grade lumber of a standard size, thereby forming two finishing strips of given face dimensions, and securing said strips in said rabbeted portions with the oblique edges engaging the inclined walls of the rabbeted portions and the outer straight edges forming the exposed edge portions of the composite lumber.

5. The method of manufacturing composite lumber consisting in rabbeting the face portion of a core body of low grade lumber, forming the inner walls of said rabbeted portions inclined upwardly, miter-ripping a section of high grade lumber of a standard size, thereby forming two finishing strips of given face dimensions, and securing said strips in said rabbeted portions with the oblique edges engaging the inclined walls of the rabbeted portions and the outer straight edges forming the exposed edge portions of the composite lumber, and securing a face strip to the face of said core body, the edges of said face strip extending past the meeting edges of the rabbeted portions and said finishing strips.

In testimony whereof I hereunto affix my signature this 5th day of Feb., 1924.

BYRD C. ROCKWELL.